United States Patent
Rasanen et al.

(10) Patent No.: US 9,587,038 B2
(45) Date of Patent: Mar. 7, 2017

(54) MANUFACTURING OF MICROCELLULOSE

(75) Inventors: Erkki Iikka Sakari Rasanen, Helsinki (FI); Leif Robertsen, Parainen (FI); Veli-Matti Vuorenpalo, Espoo (FI); Asko Karppi, Turku (FI); Kari Parviainen, Espoo (FI); Olli Dahl, Tervakoski (FI); Kari Vanhatalo, Helsinki (FI)

(73) Assignee: Kemira Oyj, Helsinki (FI)

( * ) Notice: Subject to any disclaimer, the term of this patent is extended or adjusted under 35 U.S.C. 154(b) by 123 days.

(21) Appl. No.: 13/697,729

(22) PCT Filed: Jun. 6, 2011

(86) PCT No.: PCT/FI2011/050523
§ 371 (c)(1),
(2), (4) Date: Jan. 17, 2013

(87) PCT Pub. No.: WO2011/154597
PCT Pub. Date: Dec. 15, 2011

(65) Prior Publication Data
US 2014/0179912 A1   Jun. 26, 2014

(30) Foreign Application Priority Data
Jun. 7, 2010  (FI) ...................................... 20105639

(51) Int. Cl.
*C08B 15/00* (2006.01)
*C08B 15/02* (2006.01)
*C08H 8/00* (2010.01)

(52) U.S. Cl.
CPC .............. *C08B 15/00* (2013.01); *C08B 15/02* (2013.01); *C08H 8/00* (2013.01)

(58) Field of Classification Search
CPC .... D21C 1/00; D21C 3/00; D21C 5/00; C08B 1/00; A61K 8/00; A61K 9/00; A61K 31/70; A61K 47/30
See application file for complete search history.

(56) References Cited

U.S. PATENT DOCUMENTS

| | | | | |
|---|---|---|---|---|
| 3,954,727 | A * | 5/1976 | Toshkov | C08B 15/02 536/30 |
| 5,769,934 | A * | 6/1998 | Ha | C08B 15/02 106/162.8 |
| 6,228,213 | B1 | 5/2001 | Hanna et al. | |
| 6,770,168 | B1 * | 8/2004 | Stigsson | D21C 1/06 162/24 |
| 7,005,514 | B2 * | 2/2006 | Nguyen | 536/56 |
| 7,037,405 | B2 * | 5/2006 | Nguyen et al. | 162/25 |
| 7,462,232 | B2 * | 12/2008 | Tuason et al. | 106/162.9 |
| 2004/0074615 | A1 | 4/2004 | Nguyen | |

FOREIGN PATENT DOCUMENTS

| | | |
|---|---|---|
| CN | 1222527 | 7/1999 |
| CN | 1334272 | 2/2002 |
| EP | 0609776 | 1/1994 |
| WO | 9915564 A1 | 4/1999 |

OTHER PUBLICATIONS

Gravitis, J., Vedernikov, N., Zandersons, J., Kokorevics, A., Mochidzuki, K., Sakoda, A., & Suzuki, M. (2004). Chemicals and biofuels from hardwoods, fuel crops and agricultural wastes. Retrieved on, 30.*
International Search Report and Written Opinion dated Nov. 29, 2011.
Database WPI Week 198946 Thomson Scientific London, GB AN 1989-338504, XP002663835, May 23, 1989.
Finland Search Report dated Mar. 29, 2011.
Office Action in Chinese Application 201180028041.6; State Intellectual Property Office of the People's Republic of China; dated Jun. 26, 2014; 13 pages.

* cited by examiner

*Primary Examiner* — Shaojia Anna Jiang
*Assistant Examiner* — Dale R Miller
(74) *Attorney, Agent, or Firm* — Thomas | Horstemeyer, LLP

(57) ABSTRACT

The present invention relates to a process for producing microcellulose comprising a) acidifying fibrous cellulosic material, b) washing the acidified cellulosic material, c) optionally dewatering the washed cellulosic material, and d) hydrolyzing the washed or washed and dewatered cellulosic material under acidic conditions at a temperature of at least 120° C. and at a consistency of at least 8% on dry weight of the cellulose.

28 Claims, 1 Drawing Sheet

MANUFACTURING OF MICROCELLULOSE

CROSS REFERENCE TO RELATED APPLICATION

This application is the 35 U.S.C. §371 national stage of PCT application entitled "Manufacturing of Microcellulose," having serial number PCT/FI2011/050523, filed on 6 Jun. 2011, which claims priority to Finland Application No. 20105639, filing date Jun. 7, 2010, which is incorporated by reference in its entirety.

FIELD OF THE INVENTION

The present invention relates to a process for preparing microcellulose from fibrous cellulosic material including an acidification step and hydrolysis step.

BACKGROUND OF THE INVENTION

Microcellulose (also named as e.g. level-off DP cellulose and micro crystalline cellulose) is a versatile product in many industrial applications, e.g. in food, pharmaceutical, cosmetics, paper and board and many other applications. Microcellulose can also be used in the production of derivatives of microcellulose, such as viscose cellulose, CMC, nanocellulose and various composite products.

Several methods have been proposed in the patent literature for producing microcellulose.

U.S. Pat. No. 2,978,446 describes the production of level-off DP (degree of polymerization) cellulose by acid hydrolysis and mechanical treatment. Cellulose is hydrolyzed with boiling in 2.5 normal hydrochloric acid (HCl). Acid concentration is thus 9% and temperature about 105° C. The consistency of the pulp and the amount of added acid are not specified. The hydrolyzed cellulose requires mechanical disintegration in aqueous medium.

U.S. Pat. No. 3,278,519 describes a similar method for producing level-off DP cellulose by hydrolyzing cellulose either with 2.5 normal HCl at 105° C. or with 0.5% HCl at 250° F. (121° C.). The consistency of the pulp and the amount of added acid are not specified.

U.S. Pat. No. 3,954,727 discloses a method for producing microcrystalline cellulose by hydrolyzing cellulose with dilute sulphuric acid at a temperature of from 120 to 160° C. The dilute sulphuric acid to which the cellulose is added has a concentration of 1% and the cellulose-acid mass has a concentration of 5%. Thus, the consistency of the pulp is low and the amount of acid based on the dry weight of the cellulose is high.

U.S. Pat. No. 7,037,405 describes a method, in which raw pulp material is contacted with acid and heated at elevated temperature and then treated mechanically. A suitable acid concentration is mentioned to be 1-5% of the mixture, a suitable pulp consistency 3-50%, a suitable temperature range 80-120° C. and a suitable reaction time 30 min-4 h. After acid hydrolysis the pulp mixture is treated mechanically for disintegration of the fibres. Preferably the mechanical disintegration process step shears the crystalline cellulose particles into micron size ranging form about 1 to 10 micron size. The process of U.S. Pat. No. 7,037,405 suffers of complicated production process. Mechanical disintegration step is required after acid hydrolysis. This stage requires in production costly refiner unit and refining energy of 5-100 kWh/ton.

U.S. Pat. No. 6,228,213 discloses a process for producing microcrystalline cellulose by adding an acid solution to cellulose and feeding the cellulose and acid solution through an extruder, wherein the cellulose undergoes acid hydrolysis and forms microcrystalline cellulose. The temperature of the extruder barrel during the hydrolysis is from 80 to 200° C. Due to the temperature of the extruder and the pressure created by the die or screw of the extruder, the cellulose melts in the extruder, which allows for more intimate contact between the cellulose and the acid. The compression ratio of the extruder screw is between 1.5:1 and 3:1, preferably about 3:1. Disadvantages with extruders are that they are expensive, the maintenance costs are rather high, and they require a high mechanical energy input, by estimation at least 100 kWh, typically at least 150 kWh per dry ton cellulose (the heating energy input is excluded).

U.S. Pat. No. 5,543,511 describes the production of level-off-DP cellulose using partial hydrolysis with oxygen and/or carbon dioxide at 100-200° C.

U.S. Pat. No. 4,427,778 describes the production of level-off-DP cellulose by enzymatic hydrolysis.

In view of the above described processes for producing microcellulose there is a need for an even more efficient and economical process for producing microcellulose.

SUMMARY OF THE INVENTION

According to the present invention it was surprisingly found that a high quality microcellulose with narrow particle size distribution can be produced from fibrous cellulosic material by first acidifying fibrous cellulosic material, then washing the acidified cellulosic material and finally hydrolyzing the washed cellulosic material. The particle size distribution can be easily controlled by varying the conditions of the acidification step and the hydrolysis step.

DETAILED DESCRIPTION OF THE INVENTION

Figure 1:
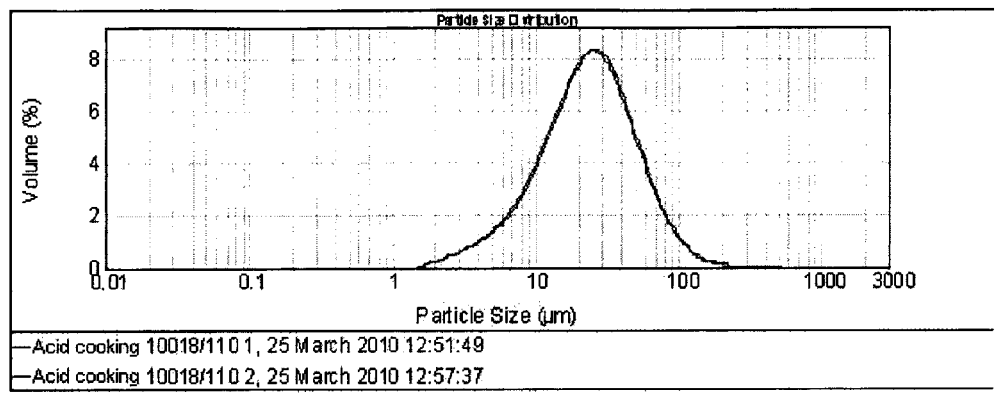
FIG. 1 shows the particle size distribution curve of microcellulose produced according to the present invention at a hydrolysis temperature of 165° C. and hydrolysis time of 180 minutes.

According to the present invention there is provided a process for producing microcellulose comprising
  a) acidifying fibrous cellulosic material,
  b) washing the acidified cellulosic material,
  c) optionally dewatering the washed cellulosic material, and
  d) hydrolyzing the washed or washed and dewatered cellulosic material under acidic conditions at a temperature of at least 120° C. and at a consistency of at least 8% on dry weight of the cellulose.

As used in this specification the term "microcellulose" includes microcrystalline cellulose MCC but refers also to similar products which are not totally crystalline but may contain some amorphous regions. The microcellulose of the present invention typically has a hemicellulose content of about 0 to 15%, preferably 0 to 10%, more preferably 0.5 to 7%, and most preferably 1 to 5% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The present invention is based on the discovery that cellulose fibres that are freed from metals become acidic enough to sustain autohydrolysis wherein the own acidity of cellulose fibres is utilized. Cellulose fibres contain acidic groups that are bound to fibre wall, e.g. uronic acids and lignin-bound ionizable groups. The fibres usually contain metal ions, e.g. $Na^+$, $Ca^{2+}$, $Mg^{2+}$ and $Mn^{2+}$, that neutralize the acidity of fibres. According to the present invention the metals are removed from fibres by acidification and washing. As a result of this ion-exchange treatment, the metals are removed from fibres and the ionized groups in the fibre wall are protonated. For monovalent ions, the ion-exchange can generally be described as follows:

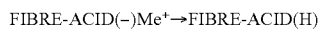
FIBRE-ACID(-)Me+→FIBRE-ACID(H)

and for divalent metal ions, the ion-exchange can generally be described as:

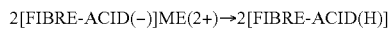
2[FIBRE-ACID(-)]ME(2+)→2[FIBRE-ACID(H)]

As a result of this ion-exchange, the fibres (i.e. cell wall of fibres) become acidic enough to sustain autohydrolysis. The resulting hydrolysis mixture contains micro-cellulose and fibre-originated reaction products but no metal ions and salts, which makes the further treatment of the microcellulose easier.

In the acidification step a) the cellulosic material is preferably acidified to a pH value of 4 or below 4, more preferably 3 or below 3. The pH is preferably 0 or over 0, more preferably 0.5 or over 0.5, still more preferably 1 or over 1. The pH is preferably between 0.5 and 4, more preferably between 1 and 3, and most preferably between 1.5 and 2.5.

In the acidification step a) the pKa value is preferably lowered to at least 1, preferably at least 1.5, more preferably at least 2 units lower than the pKa value of the acidic groups of the cellulosic fibres, e.g. uronic acids and lignin-bound ionizable groups.

Suitable acids for the acidification step are mineral acids, such as sulphuric acid, hydrochloric acid, nitric acid, sodium bisulphate or sodium bisulphite. Also mixtures of two or more of these acids may be used. A preferred mineral acid is sulphuric acid. Also organic acids, such as formic acid may be used.

The consistency of the cellulosic material in the acidification step is preferably from 5 to 40%, more preferably from 10 to 30% on dry weight of the cellulosic material.

The temperature in the acidification step is preferably less than 120° C., more preferably between 10 and 90° C., and most preferably between 20 and 70° C.

The residence time in the acidification step is preferably from 10 to 90 minutes, more preferably from 15 to 60 minutes.

After the acidification the acidified cellulosic material is washed and optionally dewatered. The washing is preferably carried out by dewatering the acidified cellulosic material to remove excess acid followed by diluting the dewatered cellulosic material and then again dewatering the material. The washing procedure can be repeated once or twice. Finally the washed cellulosic material is diluted to target consistency.

Washing can be carried out by utilizing industrial pulp washers normally used in pulp mills. A preferred embodiment comprises acidification in a vessel, followed by acid removal by screw press, followed by dilution with water, and dewatering again.

As set forth above the own acidity of the cellulosic material is utilized in the hydrolysis. Thus, it is not necessary to add acid into the hydrolysis step. However, it is possible to add minor amounts of acid into the hydrolysis, preferably at most 0.5%, more preferably at most 0.2%, most preferably at most 0.18% on dry weight of the cellulose.

The hydrolysis temperature is preferably between 120 and 185° C., more preferably between 150 and 180° C., and most preferably between 155 and 175° C.

The consistency of the cellulosic material during the hydrolysis is preferably from 8 to 60%, more preferably from 10 to 50%, even more preferably from 15 to 50%, and most preferably from 20 to 45% on dry weight of the cellulose.

The hydrolysis time is preferably from 20 to 300 minutes, more preferably from 30 to 240 minutes, still more preferably from 60 to 240 minutes, and most preferably from 60 to 240 minutes.

Preferably the hydrolysis is carried in a reactor without essential compression, the compression ratio of the reactor preferably being below 1.5:1, more preferably below 1.2:1. Preferably the mechanical energy input during the hydrolysis is provided to ensure even chemical and temperature distribution and without essential mechanical cutting and mechanical defibration of the cellulose matrix.

After the hydrolysis the obtained microcellulose-hydrolysate mixture may, if necessary, be neutralized or the microcellulose may be separated from the hydrolysate. The separated microcellulose may be washed and the separated or washed microcellulose may be neutralized. Also the acid hydrolysate may be neutralized. E.g. sodium carbonate, sodium bicarbonate, potassium hydroxide, magnesium hydroxide or sodium hydroxide may be used for the neutralization. The hydrolysate is rich in hemicellulose hydrolysis products, such as xylose and glucose, and can be used for the production of ethanol.

It has been observed that microcellulose material with an average particle size of about 8-100 µm, preferably 10-60 µm—as determined by the procedure described later on in this specification—can be produced from fibrous cellulosic material by first acidifying the fibrous cellulosic material, then washing the acidified cellulosic material and finally hydrolyzing the washed cellulosic material without a subsequent disintegration step. An essential feature of the present invention is the high consistency of the cellulosic material in the hydrolysis, which preferably is at least 20% on dry weight of the cellulose. The high consistency increases the concentration of the chemicals which has a favourable effect on the reaction speed, and also makes it easier to recover the microcellulose from the reaction mixture. In addition, the heating demand will be lower.

The fibrous cellulosic material used as a starting material in the process of the present invention may be any cellulosic material that can be hydrolyzed under the specified conditions. The fibrous cellulosic material does not necessarily have to be a pure cellulosic material but it can also contain other materials such as lignin.

The lignin content of the fibrous cellulosic starting material is preferably at most 5%, more preferably at most 2%, most preferably at most 1%.

The fibrous cellulosic starting material typically has a hemicellulose content of about 3 to 15%, preferably 5 to 10% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The fibre length of the fibrous cellulosic raw material is preferably 5-0.2 mm. For non-wood fibrous cellulosic materials, such as cotton the fibre length may be more than 5 mm.

The fibrous cellulosic material may be derived from wood plant material, such as softwoods or hardwoods.

A preferred fibrous cellulosic material is a bleached or unbleached chemical pulp, such as kraft pulp, soda-AQ pulp, sulfite pulp, neutral sulfite pulp, acid sulfite pulp or an organosolv pulp. The pulp may be softwood or hardwood pulp. The pulp may be a pulp obtained immediately after the digestion or a pulp that has been delignified after the digestion or a pulp that has been delignified and bleached. A preferred delignified pulp is an $O_2$ delignified pulp. A preferred pulp is fully bleached pulp.

According to the present invention it is also possible to use fibrous cellulosic material obtained from non-wood lignocellulosic plant materials such as cotton, grass, bagasse, straws of grain crops, flax, hemp, sisal, abaca or bamboo. Usually these plant materials are treated with an alkaline substance to break the lignocellulosic material into cellulose, lignin and hemicellulose followed by separating the cellulose from the mixture. Some lignin-poor plant materials, such as cotton linters or cotton textiles do not necessarily require a treatment with an alkaline substance. The latter materials may contain more than 90% cotton fibres of the fibrous material The fibrous cellulosic material, such as chemical pulp preferably has a lignin content of below 40 kappa number, more preferably below 30 kappa number, and most preferably below 10 kappa number.

According to a preferred embodiment of the invention the produced microcellulose has a narrow particle size distribution, wherein the average particle size (D50) is 10-60 μm, and preferably the particle size distribution (D90) is such that at least 90% by volume of the particles have a size of below 250 μm. The particle size was determined by the procedure described later on in this specification which procedure includes ultrasonic treatment which might cause deagglomerization or disintegration of the sample.

The microcellulose material obtained by the process of the invention typically has an average particle size between 8-100 μm, preferably between 10-60 μm—as determined by the procedure described later on in this specification—without any mechanical treatment. It is possible to refine the structure if finer particle size is required. Thus, the microcellulose material obtained from the hydrolysis may, if desired, be refined to a smaller particle size by using suitable devices, such as friction grinders wherein the refining is effected by grinding stones (e.g. Masuko grinder), high shear mixers or jet mills.

A benefit of the process of the invention is that the purity of the final microcellulose is moderately high and that the product can be easily washed to remove low molecular weight carbohydrates. The cellulose purity of washed microcellulose can be even over 97%.

The yield of the microcellulose depends on the conditions of the process, such as temperatures, amount of acid and retention times of the acidification and hydrolysis as well as consistency. A typical yield is at least 80%, preferably at least 85% and the yield may even be 90% or higher.

According to the present invention the microcellulose may be produced in any suitable equipment wherein the cellulose-acid mixture is not subjected to any substantial compression, such as a vessel equipped with a mixer or screw conveyor. The latter one may be a device of the M&D digester type having a screw conveyor. Other devices may be continuous bleaching reactors or down-flow continuous digesters, e.g. of type Kamyr. The compression ratio, if any, is typically below 1.5:1, more preferably below 1.2:1.

EXPERIMENTAL SECTION

The following examples describe the procedure to produce microcellulose according to invention.

The cooking experiments were done in a 5 l digester which was stirred with a mixer through the lid. The digester is heated with oil flowing in the jacket surrounding the digester. The circulating oil is heated with electricity in a separate unit.

All of the cooking experiments were done in the following manner. The cellulose material, 300 g calculated as owen dry, pulp or other, was disintegrated according to SCAN C 18:65, dewatered in a spin-dryer to 35% consistency. The pulp was then diluted to 10% consistency with de-ionized water and the pH was adjusted to 2 with sulfuric acid ($H_2SO_4$). The slurry was kept at room temperature for 30 minutes. After this the pulp suspension was spin dried to a consistency of about 35% to remove excess acid. The pulp was washed with deionized water by first diluting it to 10% consistency and then spin-drying it to a consistency of about 35%. The washing procedure was repeated. The pulp was then re-diluted to a target consistency with de-ionized water and transferred to an autoclave for the hydrolysis stage. The autoclave was heated from room temperature to reaction temperature with heating speed of 2° C./min until the target reaction temperature had been reached. Thus heating e.g. to 150° C. took 65 min and heating to 165° C. took 72.5 min. Cooking time started, when the target reaction temperature had been reached. Temperature was kept at the target temperature value during the whole cooking time. When cooking time was completed, the autoclave unit was cooled by cooling the circulating oil with cold water (temperature about 10° C.). The cooling of the reactor took about 20 minutes.

The cooled autoclave unit was opened and the cellulose mixture was removed and washed in a bag made from cloth (wire cloth) with 40 μm holes. For washing 6000 ml of de-ionized water was used.

Particle sizes of the cellulose products were determined by laser diffraction with Mastersizer 2000 (made by Malvern Instruments Ltd) equipped with a wet dispersion unit Hydro 2000MU. The determinations were done according to the following procedure:

A sample of the cellulosic material was dispersed in 500 ml of distilled water. The sample concentration was adjusted in a manner that the obscuration was 10%. Pump/stir rate of the dispersion unit was adjusted to 1500 rpm. The sample was treated with ultrasonic for 60 sec prior to the particle size measurement. Particle sizes were measured in 3 sequential measurements in 60 sec intervals. The average value of three measurements was calculated. Background was measured each time prior to the sample. The measuring time for each background and each sample measurements was 5 sec. The measurements were done using Fraunhofer parameters. More data for laser diffraction measurement principles are presented in Master sizer 2000 application note MRK 561 (Wet method development for laser diffraction measurements) by Malvern Instruments and ISO-13320-1 (1:1999), Particle size analysis—Laser diffraction General Principles.

Example 1

The above described experimental procedure was applied to fully bleached pulp. The consistency in the hydrolysis stage was 15%, the cooking temperature 165° C., and cooking time 180 min. The particle size distribution of the obtained microcellulose is shown in FIG. 1.

The results of this experiment show that hydrolysis without adding an acid at 165° C. for 180 minutes, yields good quality homogenous microcellulose with average particle size of about 20 μm without any mechanical treatment.

Example 2

Figure 2:
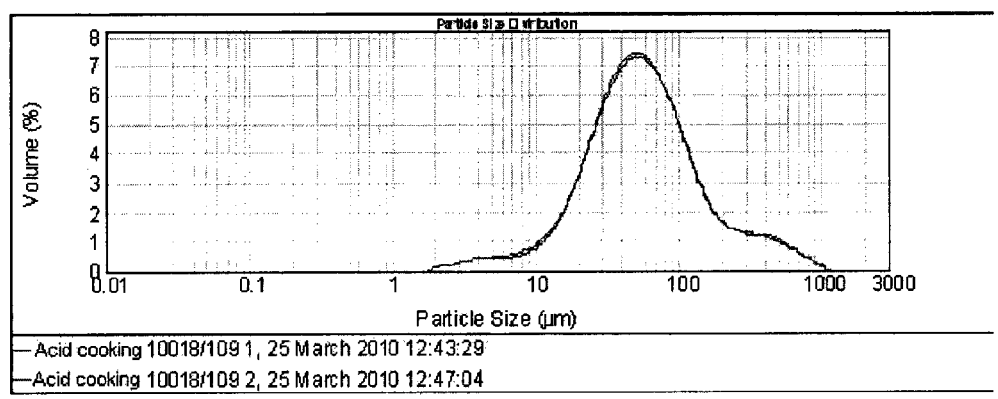
FIG. 2 shows the particle size distribution curve of microcellulose produced according to the present invention at a hydrolysis temperature of 150° C. and hydrolysis time of 120 minutes.

The above described experimental procedure was applied to fully bleached pulp. The consistency in the hydrolysis stage was 15%, the cooking temperature 150° C., and cooking time 120 min. The particle size distribution of the obtained microcellulose is shown in FIG. 2.

The results of this experiment show that hydrolysis without adding an acid at 150° C. for 120 minutes, yields rather good quality homogenous microcellulose with average particle size of about 50 μm without any mechanical treatment. As compared to example 1 the particle size is somewhat bigger.

The invention claimed is:

1. A process for producing microcellulose comprising
   a) acidifying fibrous cellulosic material at a temperature of between 20 and 70° C.,
   b) washing the acidified cellulosic material,
   c) dewatering the washed cellulosic material, and
   d) hydrolyzing the washed and dewatered cellulosic material under acidic conditions by adding at most 0.5% of acid on dry weight of cellulose at a temperature of between 150 and 180° C. and at a consistency from 8 to 60% on dry weight of the cellulose.

2. The process according to claim 1, wherein, in step a), the cellulosic material is acidified to a pH value of 4 or below 4.

3. The process according to claim 1, wherein the fibrous cellulosic material is acidified with a mineral acid.

4. The process according to claim 1, wherein the acidification time in step a) is from 10 to 90 minutes.

5. The process according to claim 1, wherein in the hydrolysis the own acidity of the cellulosic material is utilized.

6. The process according to claim 1, wherein the hydrolysis time is from 20 to 300 minutes.

7. The process according to claim 1, wherein the fibrous cellulosic material is derived from wood plant material.

8. The process according to claim 1, wherein the fibrous cellulosic material comprises bleached or unbleached chemical pulp.

9. The process according to claim 1, wherein the fibrous cellulosic material is derived from non-wood plant material.

10. The process according to claim 1, wherein the fibrous cellulosic material has a lignin content of below 40 kappa number.

11. The process according to claim 1, wherein the produced microcellulose has an average particle size of 10-60 μm.

12. The process according to claim 1, wherein, in step a), the cellulosic material is acidified to a pH value of 3 or below 3.

13. The process according to claim 1, wherein, in step a), the cellulosic material is acidified to a pH value between 1.5 and 2.5.

14. The process according to claim 1, wherein the fibrous cellulosic material is acidified with sulphuric acid, hydrochloric acid, nitric acid, sodium bisulphate or sodium bisulphate.

15. The process according to claim 1, wherein the acidification time in step a) is from 15 to 60 minutes.

16. The process according to claim 1, wherein the temperature in step d is between 155 and 175° C.

17. The process according to claim 1, wherein the consistency of the cellulosic material in step d is from 10 to 50% on dry weight of the cellulose.

18. The process according to claim 1, wherein the consistency of the cellulosic material in step d is from 15 to 50% on dry weight of the cellulose.

19. The process according to claim 1, wherein the consistency of the cellulosic material in step d is from 20 to 45% on dry weight of the cellulose.

20. The process according to claim 1, wherein the hydrolysis time is from 30 to 240 minutes.

21. The process according to claim 1, wherein the hydrolysis time is from 60 to 240 minutes.

22. The process according to claim 1, wherein the fibrous cellulosic material is softwoods or hardwoods.

23. The process according to claim 1, wherein the fibrous cellulosic material comprises kraft pulp, soda-AQ pulp, sulfite pulp, neutral sulfite pulp, acid sulfite pulp or organosolv pulp.

24. The process according to claim 1, wherein the fibrous cellulosic material is cotton, grass, bagasse, straws of grain crops, flax, hemp, sisal, abaca or bamboo.

25. The process according to claim 1, wherein the fibrous cellulosic material has a lignin content below 30 kappa number.

26. The process according to claim 1, wherein the fibrous cellulosic material has a lignin content of below 10 kappa number.

27. The process according to claim 1, wherein the produced micro-cellulose has particle size distribution of at least 90% by volume of the particles have a size of below 250 μm.

28. The process according to claim 1, wherein in the step d) none of acid is added.

* * * * *